(No Model.) 2 Sheets—Sheet 1.

J. MONTGOMERY.
SEEDER AND CULTIVATOR.

No. 370,206. Patented Sept. 20, 1887.

WITNESSES:
J. D. Garfield
C. Sedgwick

INVENTOR:
J. Montgomery
BY Munn & Co
ATTORNEYS.

(No Model.) 2 Sheets—Sheet 2.

J. MONTGOMERY.
SEEDER AND CULTIVATOR.

No. 370,206. Patented Sept. 20, 1887.

WITNESSES:

INVENTOR:
J. Montgomery
BY Munn & Co.
ATTORNEYS.

UNITED STATES PATENT OFFICE.

JAMES MONTGOMERY, OF MUNSTER, ILLINOIS.

SEEDER AND CULTIVATOR.

SPECIFICATION forming part of Letters Patent No. 370,206, dated September 20, 1887.

Application filed July 16, 1887. Serial No. 244,511. (No model.)

*To all whom it may concern:*

Be it known that I, JAMES MONTGOMERY, of Munster, in the county of La Salle and State of Illinois, have invented a new and Improved Seeder and Cultivator, of which the following is a full, clear, and exact description.

My invention relates to a combined seeder and cultivator adapted more particularly for dropping seed-grain between rows of corn-stalks left standing after harvesting the corn-crop and immediately harrowing in the dropped seed by cultivator-plows to assure proper growth of the grain.

The object of the invention is to provide a simple, inexpensive, and durable machine of this class which will enable this work to be accomplished with economy of time and labor.

The invention consists in certain novel features of construction and combination of parts of the seeder and cultivator, all as hereinafter described and claimed.

Reference is to be had to the accompanying drawings, forming a part of this specification, in which similar letters of reference indicate corresponding parts in all the figures.

Figure 1:
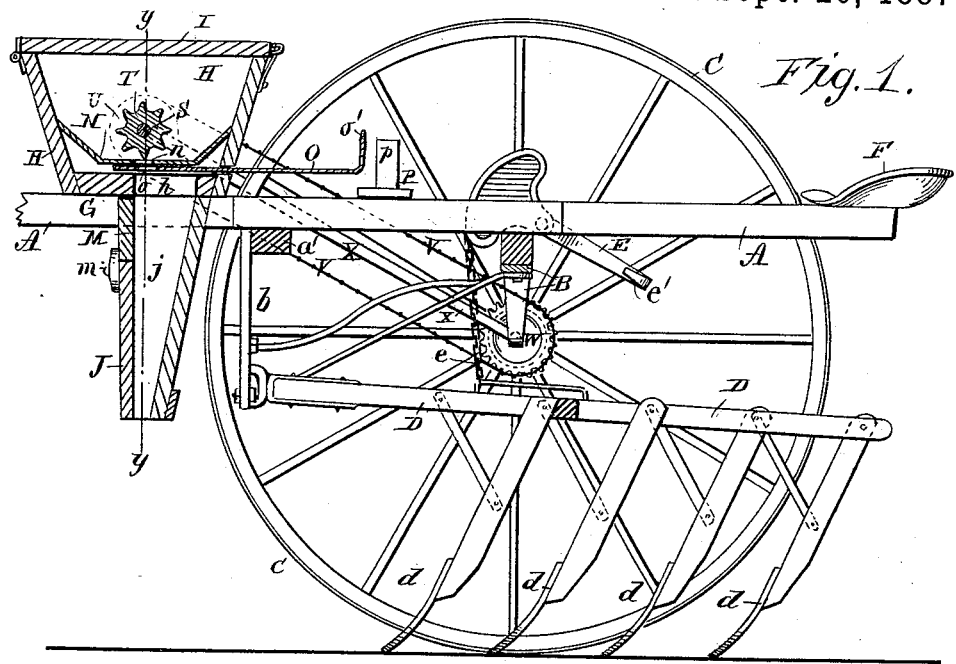
Figure 2:
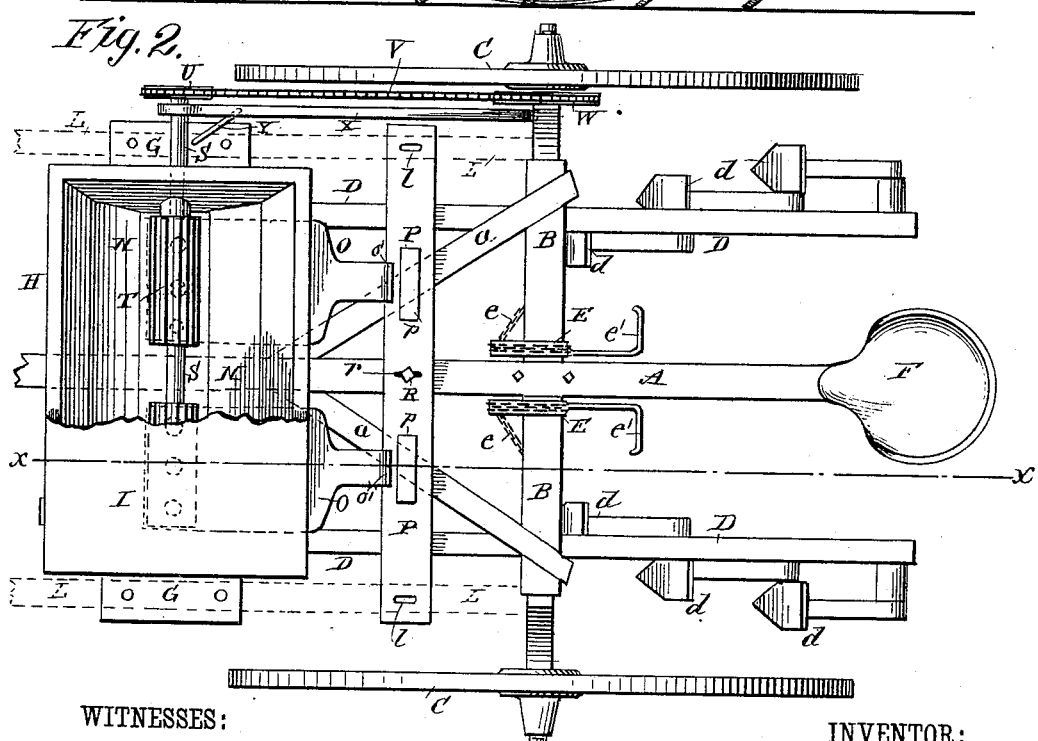
Figure 3:
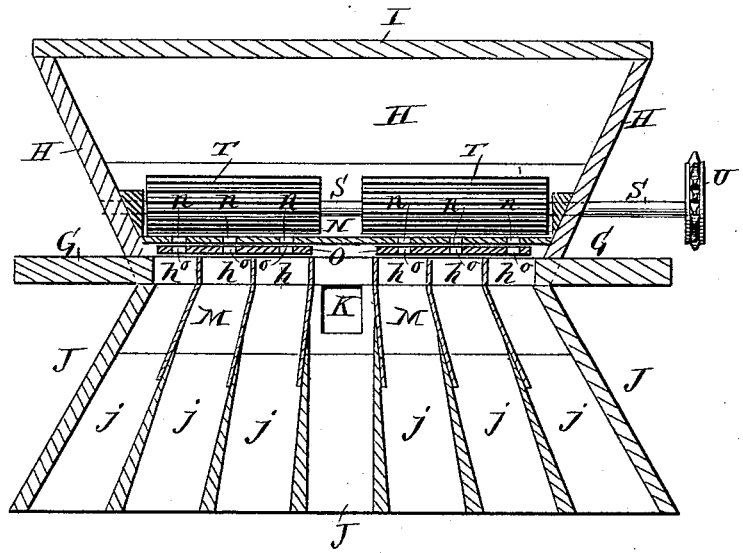
Figure 4:
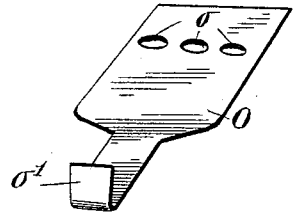

Figure 1 is a longitudinal sectional elevation of my improved seeder and cultivator, taken on the line $x\,x$, Fig. 2, and partly broken away. Fig. 2 is a plan view thereof, partly broken away. Fig. 3 is a transverse vertical section of the machine, taken on the line $y\,y$, Fig. 1; and Fig. 4 is a perspective view of one of the seed-dropping slides.

The frame of the machine comprises a draft-tongue, A, which is fixed to an axle, B, on which wheels C C are journaled, two diagonal bars, $a\,a$, which brace the tongue to the axle, and a cross-bar, $a'$, to which cross-bar are attached pendent bars or hangers $b\,b$, to which the forward ends of the cultivator-beams D D are suitably connected. The beams D D each carry shovels $d$, which harrow in or cover the seed dropped from the seeder, which is carried on the frame in advance of the cultivators, as presently described. The cultivator-beams are connected by chains $e\,e$ with the heads of levers E E, which are fulcrumed on the axle B and are provided with treadle-bars $e'\,e'$, which may be operated by the feet of an attendant sitting on a seat, F, fixed to the rear end of the tongue, A, to cause the cultivator-shovels to work at greater or less depth in the soil, or to lift the shovels clear of stumps, rocks, or other obstructions in the ordinary manner.

The seeder is made with a base board or plate, G, onto which a hopper, H, having a hinged cover, I, is fastened. The floor of the hopper is provided at each side of the lateral center of the seeder with a series of openings, $h$, preferably three at each side, and these openings communicate with flaring passages $j$, which are formed in a pendent leg, J, which is really a downward extension of the seed-hopper, from which the seed falls through the passages $j$ to the ground in front of the cultivator-shovels $d$. The hopper-leg J is provided with an opening K, through which the tongue A of the machine is passed prior to fastening the base-board G to the tongue; but when a cultivator having shafts or thills is used the opposite ends of the hopper base-plate G will be bolted directly to the shafts L, which are shown in dotted lines in Fig. 2 of the drawings. The seeder thus may be easily adjusted to a cultivator having either a draft-pole or shafts, as will readily be understood. The front wall of the seed-dropping leg J is made with a removable portion, M, which is preferably held in place by a button, $m$, and which may be easily detached at any time to allow inspection or cleaning of the seed-passages.

In the hopper H, at a little distance from its base or floor G, is fitted a false bottom, N, between which and the base G are fitted a couple of seed-dropping slides or plates, O O, each of which is provided with a series of holes, $o$, which correspond in number and lateral arrangement with the seed-openings $h$, made in the base G at the same side or end of the hopper, and the false bottom N is provided with a series of holes, $n$, at each end of the hopper, which are arranged directly over the openings $h$ of the hopper base or floor, and whereby seed will be dropped through the openings $h\,j$ of the hopper and leg H J whenever the holes $o$ in the seed-dropping slides O are brought below the holes $n$ in the hopper-bottom N. When the slides O are pushed fully forward, their holes $o$ will be forward of the holes $n$, and discharge of seed from the hopper will be prevented or cut off, and by drawing the slides rearward their holes o may be caused to open more or less to the holes n, to allow more or less seed to fall from the hopper through the openings n, o, h, and j to the ground. It is obvious that the quantity of seed discharged from the hopper may be closely regulated by adjusting the slides O, which may be conveniently reached by the attendant on the seat F of the machine.

To assure or maintain any desired rate of dropping of the seed from the hopper, I have arranged on the tongue of the machine a transversely-ranging board, P, which is provided with a couple of blocks, p p, against which the upturned rear ends, o', of the seed-dropping slides O are adapted to strike. The gage-board P is held to the tongue, preferably, by a bolt, R, which passes through a slot, r, in the board, and as this slot ranges lengthwise of the machine it is obvious that by loosening the bolt R the gage-board may be shifted backward or forward on the tongue to cause its blocks p p to strike the ends of the seed-dropping slides when they shall have been set to give the required discharge of seed from the hopper; hence the dropping of the seed may be maintained at any desired rate by adjusting the gage-board P and setting the seed-dropping slides against the blocks p of the board. The gage-board is long enough to provide in its opposite ends for slots l l, through which bolts may be passed into the shafts L when the cultivator is used with shafts; hence the gage-board will serve with either a pole or shaft drawn cultivator with like good results in gaging or maintaining regularity in the dropping of the seed.

A shaft, S, which is journaled in the hopper, has fixed to it a couple of agitators, T, made preferably in the form of elongated toothed wheels and located immediately over the seed-dropping holes n in the hopper. There is one of these agitators for each of the two sets of three feed-holes n in the hopper-bottom. The shaft projects at one end of the hopper, and to it is fixed a chain-wheel, U, from which a chain, V, passes to a chain driving-wheel, W, fixed to the axle B or to the wheel C at that side of the machine, and whereby the agitators T will be rotated in the hopper and within the seed placed therein, for causing free dropping of the seed when the slides O are set for the purpose. While going to and from the field the driving-chain may be unshipped from either of the chain-wheels, to allow the agitators to remain at rest.

To prevent overstraining of the agitator-shaft S by the draft of the driving-chain, I have provided a brace-bar, X, which is fitted at one end around the shaft S, and at its other end has a bearing on the axle B of the machine next the drive-wheel W, and, if desired, the bar X may be braced to the base or floor G of the hopper by a suitable stay-bar, Y, all as shown in Fig. 2 of the drawings.

By the use of this machine seed-grain may be sown between the rows of cornstalks in fields from which the corn had been harvested the season before, and the seed will be immediately covered up by the cultivator-plows, to prevent washing away of the seed or too early sprouting of it by influence of rains, and the work may be accomplished by a horse or team and one man or boy and with economy of time and labor.

Having thus described my invention, what I claim as new, and desire to secure by Letters Patent, is—

1. In a seeder, the combination, with a frame, of a seed-hopper mounted on the frame and provided with a seed-dropping slide, and spouts or passages in the hopper and slide for dropping the seed to the ground, and a gage-board, P, provided with a stop, p, for the seed-slide, and devices holding the gage-board adjustably to the frame, substantially as described, for the purposes set forth.

2. In a seeder, the combination, with a frame, of a seed-hopper mounted on the frame and provided with one or more seed-dropping slides and passages for exit of seed to the ground, and a gage-board, P, having stops p for the seed-slides, and having a central slot, r, and two end slots, l l, allowing passage of a bolt or bolts into either a tongue or shafts for adjusting the gage-board on the frame with reference to the seed-dropping slides, substantially as described, for the purposes set forth.

3. In a seeder, the combination, with a frame mounted on a wheeled truck, of a seed-hopper, H, on the frame, and provided with passages h, a leg, J, fixed to the hopper H and having passages j, registering with passages h, a false bottom, N, fitted in the hopper and having passages n, registering with passages h j, seed-dropping slides O, fitted to the hopper and provided with openings o, which may be brought to register more or less with the openings n, agitators T, fitted for revolution in the hopper over the holes n, and gearing U V W, operating the agitators from the truck of the machine, substantially as described, for the purposes set forth.

4. In a seeder, the combination, with a frame, its wheeled truck, agitators fitted for rotation in the seed-hopper, and mechanism U V W, operating the agitators from the truck, substantially as specified, of a stay-bar, X, bracing the agitator-shaft from the truck-axle, substantially as herein set forth.

JAMES MONTGOMERY.

Witnesses:
G. B. KOONTZ,
A. MONTGOMERY.